United States Patent [19]

Takise et al.

[11] 4,124,895
[45] Nov. 7, 1978

[54] ACOUSTIC MEASURING SYSTEM

[75] Inventors: Tadashi Takise, Hino; Keisuke Sekiguchi, Yokohama; Takeshi Matsudaira, Kamakura, all of Japan

[73] Assignee: Sony Corporation, Tokyo, Japan

[21] Appl. No.: 783,061

[22] Filed: Mar. 30, 1977

[30] Foreign Application Priority Data

Mar. 31, 1976 [JP] Japan .................................. 51-36812

[51] Int. Cl.² ...................... G01N 29/00; G10K 11/00
[52] U.S. Cl. .................................... 364/514; 73/645; 181/0.5; 364/571
[58] Field of Search ................ 235/151.3; 73/552, 554, 73/555-561, 67.2; 181/0.5; 364/514, 571

[56] References Cited

U.S. PATENT DOCUMENTS 3,658,147 4/1972 Ho et al. ................................. 73/555
3,827,288 8/1974 Fletcher ............................ 73/554 X

OTHER PUBLICATIONS

New Methods in Architectural Investigations to Evaluate The Acoustic Qualities of Concert Halls; G. Plenge, P. Lehmann, R. Wettschureck, H. Wilkens, Journal of the Acoustical Society of America, vol. 57, No. 6, pt. 1, pp. 1291-1299, Jun. 1975.

Primary Examiner—Edward J. Wise
Attorney, Agent, or Firm—Hill, Gross, Simpson, Van Santen, Steadman, Chiara & Simpson

[57] ABSTRACT

A remote terminal for use in an acoustic measuring system comprises a measuring device including an input terminal supplied with an analog signal to be measured, an A/D converter for converting the analog signal to a digital signal and an output terminal for manifesting an analyzed result of the analog signal; an analyzing apparatus is used for processing the data of the digital signal and for generating the analyzed result. The measuring device and the analyzing apparatus are coupled by MODEMs to each other through a data transmission circuit.

12 Claims, 8 Drawing Figures (A)

(B)

(C)

ACOUSTIC MEASURING SYSTEM

BACKGROUND OF THE INVENTION

1. Field of the Invention

This invention relates to an acoustic measuring system, and more particularly to an acoustic measuring system which is simple in construction and can promptly obtain measuring results as analyzed data.

2. Description of the Prior Art

Generally, it is very important to know the acoustic characteristics of a certain room such as a lecture room and a listening room whose acoustic characteristics come into question, in order to improve the sound situation of the room.

For such a purpose, different acoustic measuring methods or systems are hitherto developed.

In the measurement of the acoustic characteristics, it is important to promptly obtain and investigate the measuring results at the measuring place. In order to obtain promptly the measuring results, all of necessary measuring instruments should be transported to the measuring place. Generally, the number of the necessary measuring instruments increases with the number of the objects to be measured. The transporting operation is very troublesome.

In the acoustic field investigation system in which a service man goes to the room provided with an acoustic equipment such as a stereo amplifier, and measures the acoustic characteristics of the room to advise the user on the arrangement of the acoustic equipment, it is substantially impossible to transport numerous measuring instruments to the room.

In the conventional acoustic measuring method, the measuring results are brought to the service station from the room, and analyzed there in a few days, to know the acoustic characteristics of the room. Accordingly, the conventional acoustic measuring method takes a long time to know the acoustic characteristics of the room.

SUMMARY OF THE INVENTION

An object of this invention is to provide a novel acoustic measuring system which overcomes the above disadvantages of the conventional methods.

Another object of this invention is to provide an acoustic measuring system in which measuring data are analyzed by an analyzing system remote from a measuring place, and thereby the number of the measuring instruments necessary for measuring the acoustic characteristics of the room at the measuring place is widely reduced.

A further object of this invention is to provide an acoustic measuring system in which a measuring system is connected through a data transmission circuit to a data analyzing system, and thereby the measuring results can be promptly known at the measuring place.

A still further object of this invention is to provide an acoustic measuring system in which a normal telephone transmission circuit can be used as the data transmission circuit, thereby which can be applied substantially to any of measuring place, and by which information can be easily transmitted between the measuring system and the data analyzing system.

A still further object of this invention is to provide an acoustic measuring system in which measuring data are analyzed by a computer, and thereby the subjective analysis of a measuring person and any error can be avoided, and so measuring results can be obtained with high accuracy.

A still further object of this invention is to provide an acoustic measuring system in which the measurement can be automatized, and the data accumulation can be facilitated.

A still further object of this invention is to provide an acoustic measuring system in which a level equalizer having a predetermined frequency characteristic is arranged, whereby all frequency components of the analog signal to be measured can be equally serviced, and the accuracy of measurement can be improved.

A still further object of this invention is to provide an acoustic measuring system which includes a measuring apparatus as a terminal system, easily transportable and simple in construction.

A still further object of this invention is to provide an acoustic measuring system in which the number of objects to be measured, such as transmission characteristic, reverberation time, ratio of direct sound to indirect sound, time-weighting center, and D-valve, can be freely increased or decreased in use of the same measuring apparatus by reforming only a data analyzing system.

A still further object of this invention is to provide an acoustic measuring system in which measuring data of plural measurements are written, in sequence, into a memory, starting from a predetermined address, and after the end of the plural measurements, the measuring data stored in the memory are read out and transmitted, and thereby the measuring data of the plural measurements can be transmitted to a data analyzing system such as a computer system by only one read-out operation.

A still further object of this invention is to provide an acoustic measuring system in which an ambient noise signal, applied to an input terminal before a signal to be measured on the acoustic characteristic of a room is applied to the input terminal, is stored in a shift register; sequentially the signal to be measured is stored in a predetermined region of a random access memory, thereafter the ambient noise signal is read out from the shift register and transferred to the remaining region of the random access memory, and thereby two successive information signals can be stored, in succession, in one random access memory.

In accordance with one aspect of this invention, a remote terminal for use in an acoustic measuring system comprises: a measuring system including a signal generator for generating a reference signal, an input terminal supplied with an analog signal to be measured corresponding to the reference signal, an amplifier for preamplifying the analog signal, an analog-to-digital converter for converting the analog signal to a digital signal, and a modulator responsive to the digital signal for producing a modulated signal; an analyzing system including a demodulator for demodulating the modulated signal, a data processor for processing the demodulated signal so as to generate analyzed data; and a data transmission circuit for connecting the measuring system and the analyzing system to each other.

Other objects features and advantages of this invention will be apparent from the following description taken in conjunction with the accompanying drawings.

DESCRIPTION OF THE PREFERRED EMBODIMENT

Figure 1:
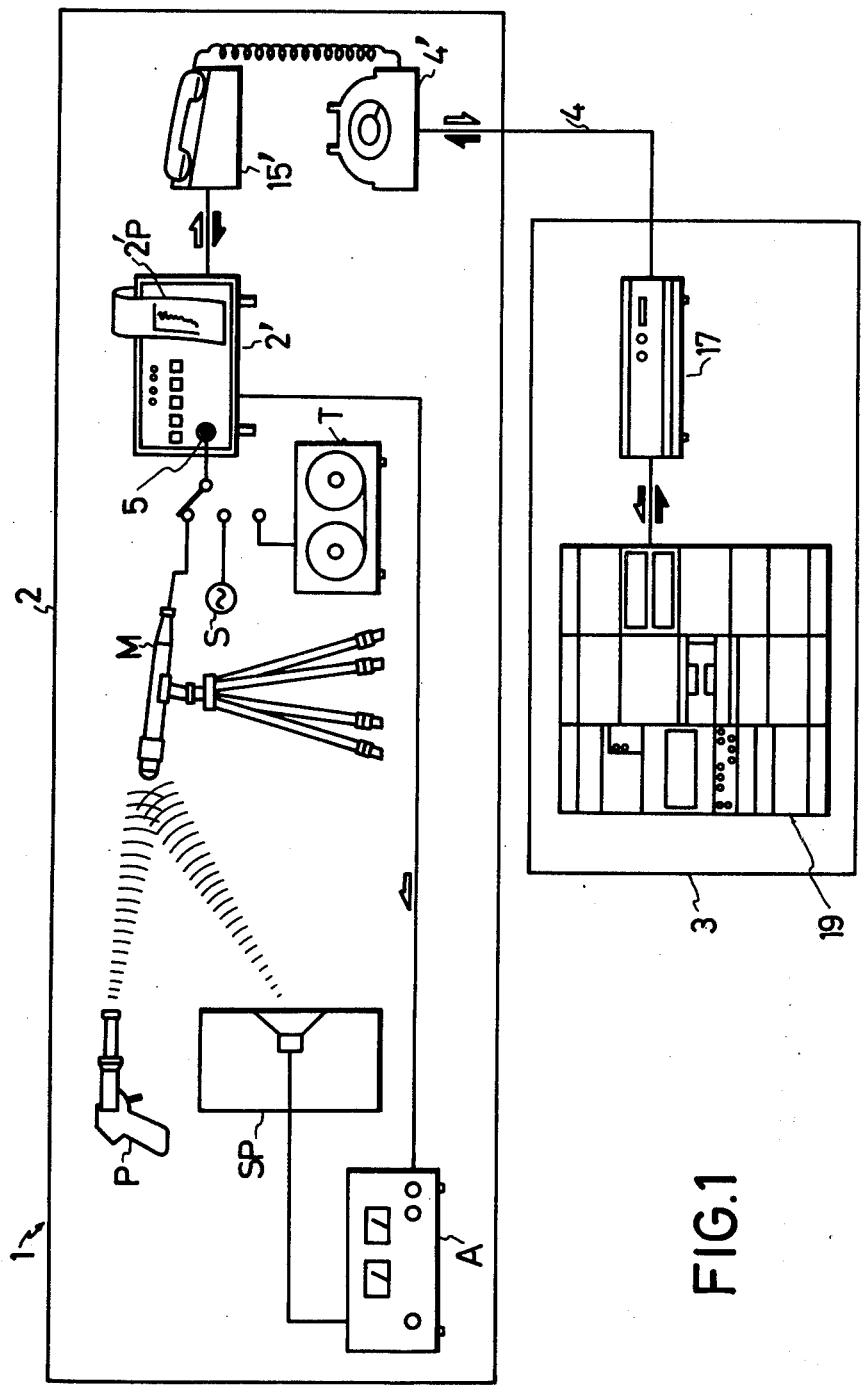
FIG. 1 is a view showing an exemplary embodiment of an acoustic measuring system according to this invention.

Referring to FIG. 1, an acoustic measuring system 1 consists of a terminal system 2 which is arranged in a listening room, and a computer system 3 which is located remotely from the listening room, at a service station. Data are transmitted and received between the terminal system 2 and the computer system 3 through a data transmission circuit 4. A microphone M, or an electrical signal S is applied to the input terminal 5 of a terminal unit 2', which forms a part of the terminal system 2. A shock sound and a reverberation sound which are generated when a piston P is fired, are caught by the microphone M. The output signal of the microphone M is applied to the input terminal 5. Alternatively, when a tone burst signal is applied to a loudspeaker SP through an amplifier A from a tone burst generator 20 (FIG. 2), the direct sound from the loudspeaker SP and the reverberation sound are caught by the microphone M, and the output signal of the microphone M is applied to the input terminal 5. Or the shock sound or direct sound and the reverberation sound from the pistol P or the loudspeaker SP may be recorded in a tape recorder T, via a connection (not shown) from the microphone M to the tape recorder T, and the reproduced signal from the tape recorder T may be applied to the input terminal 5.

The above described electrical signal S may be obtained for example, from a preamplifier arranged in a stereo amplifier. In that case, the electrical characteristics of the preamplifier can be measured and analyzed by the acoustic measuring system.

The signal applied to the input terminal 5 is suitably processed in the terminal unit 2', as described hereafter, and then it is modulated by a MODEM 15 contained within an acoustic coupler 15'. The modulated signal is transmitted through a normal telephone set 4', to the data transmission circuit 4.

At the remote location, the modulated signal transmitted from the terminal system 2 is demodulated by another MODEM 17, and applied to a computer 19, which forms part of the computer system 3. The demodulated signal is processed by the computer 19 to obtain analyzed data. The analyzed data is transmitted back through the MODEM 17 to the listening room, and it is displayed by a printed 2'P which forms part of the terminal unit 2' of the terminal system 2.

Figure 2:
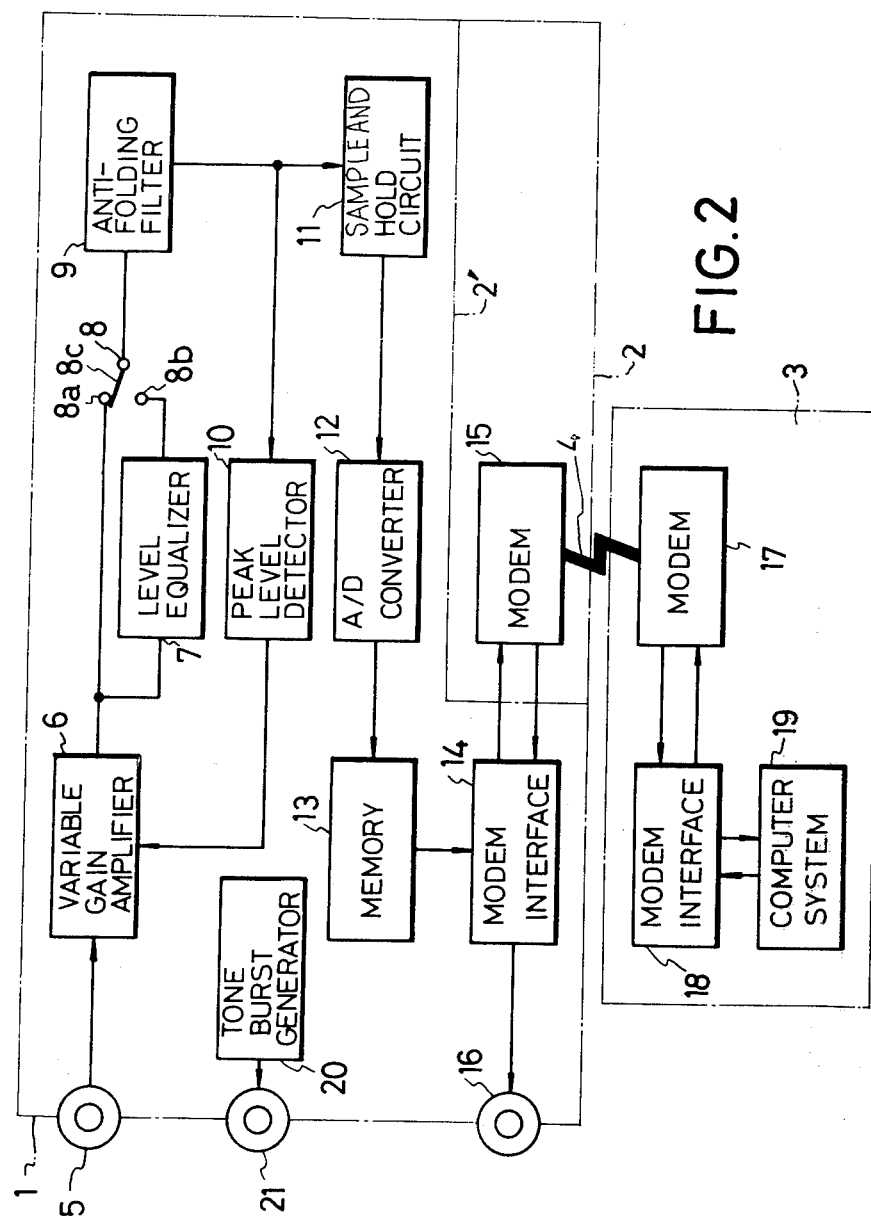
FIG. 2 is a block diagram of an acoustic measuring system according to one embodiment of this invention.

Referring to FIG. 2, in the terminal unit 2', a variable gain amplifier 6 is connected to the input terminal 5. The output of the variable gain amplifier 6 is applied to a level equalizer 7 and a stationary contact 8a of the change-over switch 8. The output of the variable gain amplifer 6 is applied through the level equalizer 7 to another stationary contact 8b of the change-over switch 8. An anti-folding filter 9 is connected to the movable contact 8c of the change-over switch 8. The output signal of the anti-folding filter 9 is fed back through a peak level detector 10 for detecting the peak valve of the output signal of the anti-folding filter 9, to control the variable gain amplifier 6. A sample and hold circuit 11 is connected to the anti-folding filter 9. The output of the sample and hold circuit 11 is applied to an A/D converter 12, and is converted to a digital signal thereby. The output of the A/D converter 12 is stored in a memory 13. A MODEM interface 14 is connected to an output terminal of the memory 13. The digital signal stored in the memory 13 is modulated through the MODEM interface 14 by the MODEM 15, and transmitted from the MODEM 15 to the computer system 3. The MODEM INTERFACE 14 is also connected to an output terminal 16 for the printer 2'P.

Further, a tone burst generator 20 for generating a reference sound is contained in the terminal equipment 2'. The output of the tone burst generator 20 is obtained from an output terminal 21.

In the computer system 3, the MODEM 17 is connected to the data transmission circuit 4, and is also connected with the computer 19, through a MODEM interface 18.

The above described arrangements will now be described when the acoustic characteristics of the listening room are to be measured. First, one case when the change-over switch 8 selects the stationary contact 8a, will be described. Then, the case when the change-over switch 8 selects the stationary contact 8b will be described.

The input signal from the input terminal 5 is applied through the variable gain amplifier 6, the stationary contact 8a of the change-over switch 8, and the anti-folding filter 9 to the peak level detector 10. The output of the peak level detector 10 is applied to the control input of the variable gain amplifier 6. The gain of the variable gain amplifier 6 is controlled with the output of the peak level detector 10 so that the dynamic range of the A/D converter 12 becomes maximum in response to the peak level of the input signal of the frequency range to be measured.

After the gain of the variable gain amplifier 8 is set in the above described manner, the input signal is again applied to the input terminal 5, and is amplified at the set gain by the variable gain amplifier 6. The amplified input signal is applied to the anti-folding filter 9 which eliminates the folded beat between the half of the sampling frequency $f_s$ of the sample and hold circuit 11 and the frequency of the amplified input signal. The amplified input signal from the anti-folding filter 9 is applied to the sample and hold circuit 11, and is sampled at the sampling frequency $f_s$ thereby in accordance with the frequency range to be measured. The output of the sample and hold circuit 11 is applied to the A/D converter 12, and is converted to a coded digital signal thereby. The digital signal is stored in sequency by the memory 13. For example, a RAM (Random Access Memory) can be used as the memory 13. The digital signal is read out from the memory 13 at the permissible rate of the data transmission circuit 4, and applied through the MODEM interface 14 to the MODEM 15. The digital signal is frequency-modulated, amplitude-modulated or modulated in another manner by the MODEM 15.

The modulated signal is demodulated to the original digital signal by the MODEM 17. The digital signal is transmitted through the MODEM interface 18 to the computer 19, and analyzed by the computer 19. Different kinds of data are obtained from the computer 19 in response to different conditions of the listening room.

The data signal from the computer 19 is applied through the MODEM interface 18 to the MODEM 17, and is frequency-modulated, amplitude-modulated or modulated in another manner by the MODEM 17. The modulated signal is transmitted through the data transmission circuit 4 to the MODEM 15. The signal demodulated by the MODEM 15 is applied through the MODEM interface 14 to the output terminal 16, and is displayed by the printed 2'P connected to the output terminal 16.

In the acoustic measuring system 1, the terminal system 2 can be assembled to be compact in construction, and so it is convenient for transportation. When the kinds of measurements to be taken and analyzed are increased, only the computer system 3 is reorganized, and the terminal system 2 does not need to be reorganized. The same terminal system 2 can be used as a measurement instrument for different kinds of measurement values. Since the data is analyzed by the computer 19, errors are avoided which otherwise would be caused by the subjective analysis of a measuring person. The measurement can be automated, and the data can be easily accumulated. For example, transmission characteristics, a reverberation time of reverberation curve, the ratio of direct sound to indirect sound, the time-weighting center, and the D (Definition)-value can all be measured by the acoustic measuring system 1.

Figure 3:
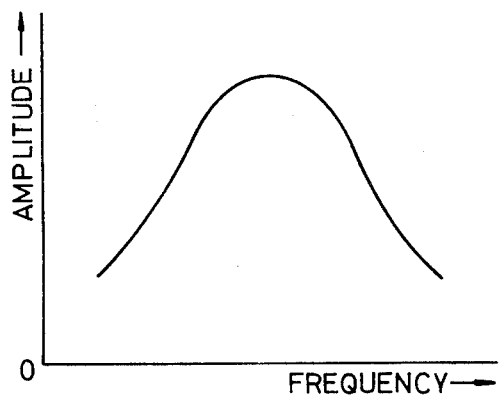
FIG. 3 illustrates three graphs (A), (B) and (C), showing frequency-amplitude characteristics for explaining a level equalizer used in the acoustic measuring system.
Figure 3:
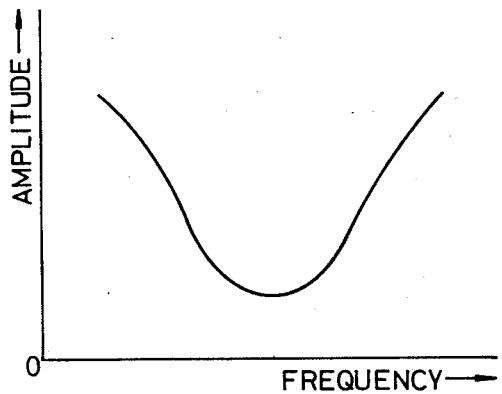
Figure 3:
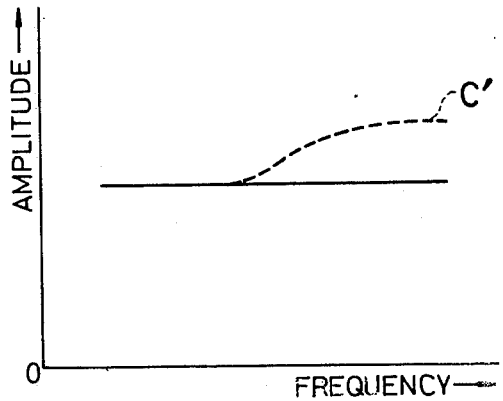

Next, the level equalizer 7 in FIG. 2 will be described, with reference to FIG. 3.

The maximum resolution, namely the dynamic range for the A/D conversion depends on the number N of bits of the digital code. The maximum value MAX to be coded to N-bits is expressed by:

$$MAX = 2^N LSB \quad (1)$$

where LSB represents the value represented by the bit of the least weight. Therefore, the dynamic range $DR_0$ is expressed by:

$$DR_0 = 20 \log_{10}(\frac{MAX}{LSB}) = 20 \log_{10}(\frac{2^N LSB}{LSB}) \quad (2)$$

$$= 20 \log_{10} 2^N \approx 6.021 \cdot N (dB)$$

However, the input signal is normally a composite signal containing different frequency components. All of the frequency components have not always the same dynamic range.

For example, there will be considered the composite signal containing two frequency components whose frequencies are $f_1$ and $f_2$, and whose amplitude-ratio is M:1 (M ≧ 1).

The amplitude of the composite signal becomes maximum when the phase difference between the two frequency components becomes a certain value. And it becomes minimum when the phase difference between the two frequency components becomes another certain value. Accordingly, the dynamic range of the composite signal is between the maximum amplitude and the minimum amplitude. Because the gain of the variable gain amplifier 6 is so set that the A/D converter 12 obtains the maximum resolution for the composite signal, the dynamic ranges of the two frequency components are narrowed.

When the maximum amplitude of the frequency component $f_1$ is $MAX_1$, the maximum amplitude of the frequency component $f_2$ is expressed by $MAX_1/M$. The relationship between the MAX of the formula (1) and the $MAX_1$ is as follows:

$$MAX \geq MAX_1 + \frac{MAX_1}{M} = MAX_1(\frac{M+1}{M})$$

Therefore, $$MAX_1 \leq \frac{M}{M+1} \cdot MAX \quad (3)$$

The dynamic range $DR_1$ of the frequency component $f_1$, and the dynamic range $DR_2$ of the frequency component $f_2$ are as follows:

$$DR_1 = 20 \log_{10}(\frac{MAX_1}{LSB}) = 20 \log_{10}(\frac{M}{M+1} \cdot \frac{MAX}{LSB}) \quad (4)$$

$$= DR_0 - 20 \log_{10}(\frac{M+1}{M})$$

$$DR_2 = 20 \log_{10}(\frac{\frac{MAX_1}{M}}{LSB}) = 20 \log_{10}(\frac{\frac{MAX}{M+1}}{LSB}) \quad (5)$$

$$= DR_0 - 20 \log_{10}(M+1)$$

With respect to the above formula (4), only when M is infinitely large, namely when the frequency component $f_2$ is omitted, the dynamic range $DR_1$ of the frequency component $f_1$ is equal to the maximum resolution of the A/D converter. However, the dynamic range $DR_1$ of the frequency component $f_1$ is smaller by $20 \log_{10}(M+1/M)$ than the maximum resolution of the A/D converter.

With respect to the formula (5), the dynamic range of the frequency component $f_2$ is reduced with the increase of the value of M. It is smaller by $20 \log_{10}(M+1)$ than the maximum resolution of the A/D converter.

Normally, in the measurement of the acoustic characteristics of the listening room, the reverberation time, the D-value and the time-weighting center are obtained from the reverberation curve, where the change of the frequency components with time is observed. All of the frequency components should be equally services. Moreover, the widest dynamic range possible should be warranted. For that purpose, the level equalizer 7 is arranged before the A/D converter 12. The frequency spectrum of the input signal from the variable gain amplifier 6 is equalized in level by the level equalizer 7.

An example of the frequency characteristic of the level equalizer 7 is shown in FIG. 3(b). The frequency characteristic is in inverted relationship with the frequency spectrum of the reference input signal shown in FIG. 3(A).

The reference input signal is obtained from the variable gain amplifier 6 when the pistol P is fired in an anechoic room, or when a tone burst signal is emitted from the loudspeaker SP in the anechoic room. When the reference input signal is applied to the input terminal 5, the frequency characteristic of the output of the level equalizer 7 is substantially straight as shown by the solid line in FIG. 3(C). In the measurement of the acoustic characteristic of the listening room, the input signal to be measured is applied to the input terminal 5, and equalized by the level equalizer 7. The frequency characteristic of the output of the frequency equalizer 7 is curved in accordance with the situation of the listening room, as shown by the dotted line $c'$ in FIG. 3(C). The output of the level equalizer 7 is sampled, and converted to a digital signal. In the analysis by the computer 19, all of the frequency components can be serviced as equally as possible. A relatively wide dynamic range can be warranted for all of the frequency components. Accordingly, when the change-over switch 8 is closed at the stationary contact 8b, the accuracy of measurement is raised.

Next, the memory 13 used in the acoustic measuring system 1, will be described, in reference to FIGS. 4 and 5.

When the acoustic characteristic of the listening room is measured with the firing sound of the pistol, ambient noises at the time of measurement affect measuring data, and so there is some error in the measurement result. In order to reduce some error, it is considered that the acoustic characteristic of the listening room is repeatedly measured for a suitable number (N') of times, and that the N'-measurement results are averaged. However, it takes some trouble and long time to repeatedly measure the acoustic characteristic of the listening room N'-times, and to separately transmit the N'-measuring data.

In one modification for solving the above-described problem will be described, the measuring data of the N'-measurements are stored all together in the memory, and transmitted to the computer system 3 at a time.

Figure 4:
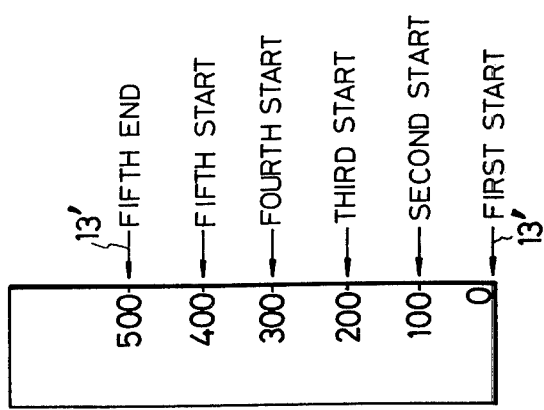
FIG. 4 is a schematic view of a memory for explaining one method of using the memory in the acoustic measuring system.

FIG. 4 shows a method for writing the measuring data into the memory 13. And FIG. 5 shows a block diagram for the method in which the analog data signal to be measured is converted to a digital signal, with the digital signal being written into the memory 13, and the digital signal being read out from the memory 13 and transmitted to a receiver 23.

Figure 5:
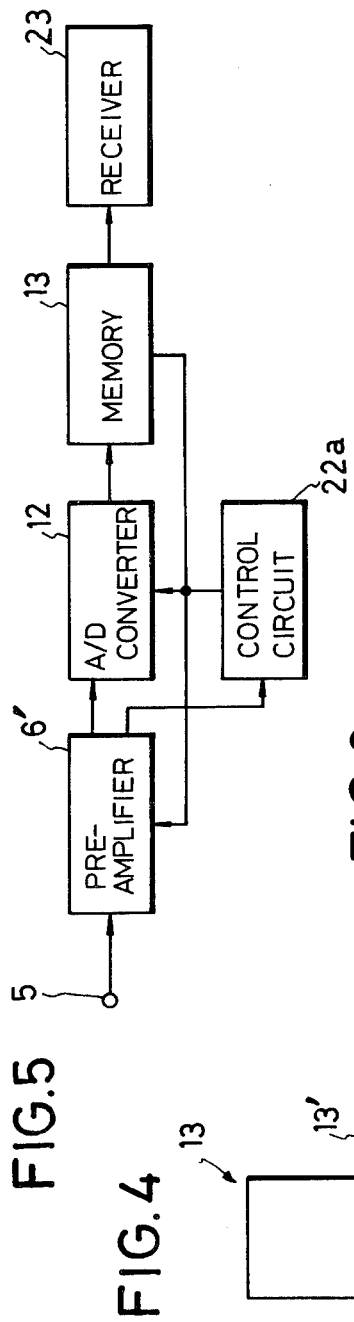
FIG. 5 is a block diagram of a circuit used in connection with the method according to FIG. 4.

In FIG. 5, the analog data signal applied to the input terminal 5 is amplified by a preamplifier 6' corresponding to the variable gain amplifier 6 of FIG 2, so as to obtain a suitable level to be converted to a digital signal. The amplified analog signal is converted to the digital signal by the A/D converter 12. The digital signal is written into the memory 13 with a write instruction signal which is applied to the memory 13 from a control circuit 22a. The data stored in the memory 13 is read out from the memory 13 with a read instruction signal which is applied to the memory 13 from the control circuit 22a, and the data is transmitted to the receiver 23.

Operations of the block diagram of FIG. 5 will now be described in more detail. First will be described one case that the number of the measuring data for one measurement is 100, and that the number N' of measurements is 5. In that case, one measuring datum is written into one address of the memory 13, and the measuring data are written into addresses of the memory in numerical order, starting from an address 0.

In the beginning of the first measurement, a pointer 13' of the memory 13 indicates the address 0. A hundred measuring data of the first measurement are written into an address 99 from the address 0 in numerical order. In the beginning of the second measurement, the pointer 13' of the memory 13 indicates an address 100. A hundred measuring data of the second measurement are written into an address 199 from the address 100 in numerical order. Similarly, a hundred measuring data of the third measurement and a hundred measuring data of the fourth measurement are written into an address 299 from an address 200, and into an address 399 from an address 300, respectively. And when a hundred measuring data of the fifth measurement has been written into an address 499 from an address 400, the pointer 13' indicates an address 500.

In the transmission of the stored measuring data of the five measurements to the receiver 23, the measuring data of the fifth measurement are first read out from the memory 13. The address number indicated by the pointer 13' decreases one by one with the transmission of one measuring datum. When the pointer 13' indicates the address 0, the read out ends. An information signal that all of the measuring data of the five measurements have been transmitted to the receiver 23, is applied to the receiver 23 from the memory 13 (FIG. 5). Thereby, the receiver 23 discriminates the number of the measurements.

The above method illustrated in FIGS. 4 and 5 can be used for the memory 13 of the acoustic measuring system 1 shown in FIG. 2.

For example, when the lower frequency components of the input signal are measured in the acoustic measuring system 1, a lower sampling frequency $f_s$ is selected for the sample and hold circuit 11. And when the higher frequency components of the input signal are measured in the acoustic measuring system 1, a higher sampling frequency $f_s$ is selected for the sample and hold circuit 11. For example, when the data storage capacity of the memory 13 is 8000, the sampling frequency $f_s$ for the measurement of the lower frequency components is 1 KHz, and the sampling time is one second, the measuring data of eight measurements can be stored in the memory 13 divided into eight parts according to the method of FIG. 4. And when the higher frequency components are measured, the parts of the divided memory 13 are united with each other.

Next, there will be described the case in which the acoustic condition of the listening room is measured and the resulting input signal is stored in the memory 13 before the pistol is fired or the tone burst is emitted from the loud speaker SP.

Figure 6:
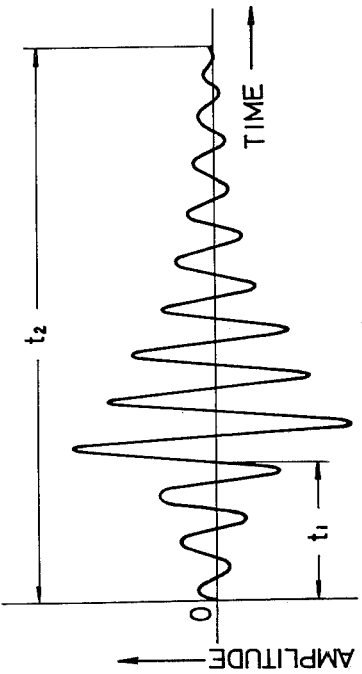
FIG. 6 is a graph of one example of an analog signal to be measured by the acoustic measuring system.

FIG. 6 shows one example of the waveform of the input signal applied to the input terminal 5 of the terminal unit 2'. After the time interval $t_1$, the pistol is fired or the tone burst is emitted from the loudspeaker SP. The time interval $t_2$ is a predetermined measurement time. When the input signal as shown in FIG. 6 is applied to the input terminal 5 after the time interval $t_1$, it is often required that the input signal before the time interval $t_1$ is measured. For that case, when a shift register is used as the memory 13, the data written into the memory cannot be read out from an arbitrary storage region of the shift register. This is inconvenient. And when a RAM (Random Access Memory) is used as the memory 13, the control of address order is complicated. Another modification for overcoming this problem will now be described with reference to FIG. 7 and FIG. 8. The modification will be used for the acoustic measuring system 1.

Before the pistol P is fired or the tone burst is emitted from the loudspeaker SP, the ambient noise signal as the input signal is applied to the input terminal 5 from the time $t = 0$, and converted to a digital signal by the A/D converter 12. The digital signal is, in sequence, applied to the shift register 13a, and the RAM 13b stops working.

When the time interval $t_1$ lapses, the pistol P is fired, or the tone burst is emitted from the loudspeaker SP. That is detected by a level detector 24. The detecting signal of the level detector 24 is applied to a control circuit 22b. The level detector 24 is so designed as to generate the detecting signal when an input signal having a higher peak level than half of a predetermined level is applied to the level detector 24. The level detector 24 can be arranged at an arbitrary position in the line between the input terminal 5 and the A/D converter 12.

With the application of the detecting signal to the control circuit 22b, a trigger signal is obtained from the control circuit 22b, and is applied both to the shift register 13a and to the RAM 13b. With the trigger signal, the shift register 13a stops working, and the RAM 13b starts to work. The digital signal from the A/D converter 12 is written into the RAM 13b. In order to leave a storage region for the information before the time $t_1$, the digital signal from the A/D converter 12 is written into an address $S_1$ in the RAM.

When the bit number of the shift register 13a is $n$, and the sampling interval is $T_s$, or $n \cdot T_s$ items of data are held in the shift register 13a during the time interval $t_1$. When the predetermined measurement time $t_2$ lapses, a signal is obtained from the control circuit 22b. With the signal, the writing from the A/D converter 12 into the RAM 13b stops, and the shift register 13a starts to work. The held informations are shifted from the shift register 13a into the RAM 13b. The held informations are written into the storage region from an address 0 to an address $(S_1 - 1)$, in FIG. 8. Thus, the groups A and B of data before and after the pistol is fired (or the tone burst is emitted from the loudspeaker SP), are written into the RAM 13b.

Figure 7:
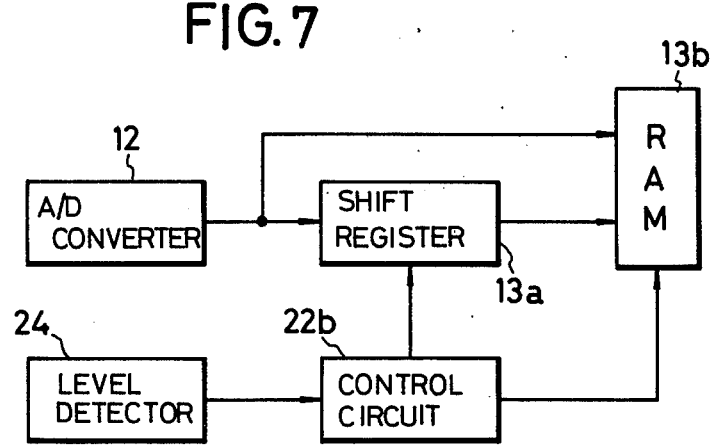
FIG. 7 is a block diagram of a circuit for measuring the analog signal of FIG. 6.
Figure 8:
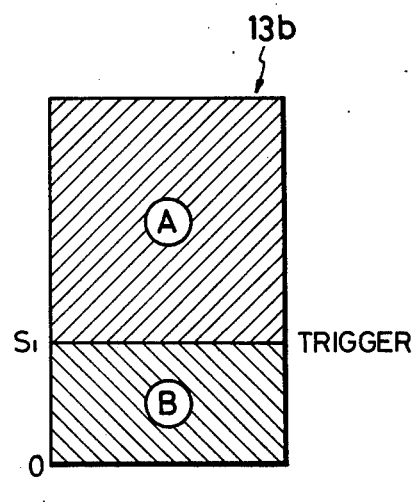
FIG. 8 is a schematic view of a random access memory for explaining two information sections therein.

Although there has been described the case that the block diagram of FIG. 7 is used for the acoustic measuring system of FIG. 2, the arrangement illustrated by the block diagram of FIG. 7 can be used for any situation in which two groups of data, before and after a time are written into the RAM 13b so as to be discriminated.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

We claim as our invention:

1. A remote terminal for use in an acoustic measuring system comprising:
   (a) a signal generating means for generating a reference signal,
   (b) an input connector supplied with an analog signal to be measured corresponding to said reference signal,
   (c) an amplifying means for preamplifying said analog signal,
   (d) analog-to-digital converter means for converting said analog signal to a digital signal,
   (e) memory means; and
   (f) an input/output port suitable for bidirectional communication with a remote analyzing device;
      said input connector being connected to said amplifying meams;
      said amplifying means being connected to said analog-to-digital converter means;
      said memory means being connected to said analog-to-digital converter means and operative to store digital signals generated by said analog-to-digital converter means;
      said input/output ports being connected to said memory means.

2. A terminal for use in acoustic measuring system according to claim 1, wherein said measuring system further includes a printing means connected to said input/output port.

3. A terminal for use in an acoustic measuring system according to claim 1, wherein said amplifying means comprises a variable gain amplifier.

4. A terminal for use in an acoustic measuring system according to claim 3, having further a peak level detecting means connected to an output of said variable gain amplifier for generating a detected signal, and means connecting said detected signal to said amplifying means for controlling the gain of said amplifying means so as to correspond to a dynamic range of said analog-to-digital converter means.

5. A terminal for use in an acoustic measuring system according to claim 1, having further a sample and hold circuit connected between an output of said amplifying means and said analog-to-digital converter means, and a filter means connected between said output of said amplifying means and said sample and hold circuit for eliminating a folded beat of half of the sampling frequency of said sample and hold circuit and a frequency of said analog signal.

6. A terminal for use in an acoustic measuring system according to claim 1, having further a level equalizing circuit connected between an output of said amplifying means and said analog-to-digital converter means and having a frequency characteristic to equalize the level of the frequency spectrum of said reference signal.

7. A terminal for use in an acoustic measuring system according to claim 6, having further a switching means having first and second input terminals and an output terminal, said first input terminal of said switching means being connected to said amplifying means directly, said second input terminal of said switching means being connected to said amplifying means through said level equalizing circuit, and said output terminal of said switching means being connected to said analog-to-digital converter means.

8. A remote terminal for use in an acoustic measuring system according to claim 7, wherein said memory means comprises a memory device connected to said analog-to-digital converter means, and a control means for generating one or more control signals to command said memory device to store and/or to read out previously stored digital signal, generated by said analog-to-digital converter means.

9. A terminal for use in an acoustic measuring system according to claim 8, wherein said memory device has a plurality of storage regions, each of said storage regions being loaded with a plurality of digital signals generated by said analog-to-digital converter means; the members of said plurality of digital signals stored in a selected one of said storage regions being readable in sequence.

10. A terminal for use in an acoustic measuring system according to claim 8, wherein said memory device comprises a random access memory connected to said analog-to-digital converter means, and a shift register connected between said analog-to-digital converter means and said random access memory.

11. A terminal for use in an acoustic measuring system according to claim 10, wherein said random access memory has first and second storage regions, and said analog-to-digital converter means manifests first and second digital signals in series; said first digital signal being applied to said shift register; said second digital signal being applied to said first storage region of said random access memory; said first digital signal then being transferred from said shift register to said second region of said random access memory.

12. A remote terminal for use in an acoustic measuring system comprising: an input terminal; a varible gain amplifier; a level equalizer, switch means; an anti-folding filter; a peak level detector; a sample and hold circuit; an analog-to-digital converter; memory means; and a bi-directional input/output port; said input terminal being connected to said variable gain amplifier; the output of said variable gain amplifier being connected on one hand to an input to said level equalizer and on the other hand to a first input to said switch means; an output from said level equalizer being connected to a second input to said switch means; an output from said switch means being connected to an input to said anti-folding filter; an output of said anti-folding filter being connected on one hand to an input to said sample and hold circuit and on the other hand to an input to said peak level detector; an output from said peak level detector being connected to a gain varying input of said variable gain amplifier; an output from said sample and hold circuit being connected to an input to said analog-to-digital converter; an output from said analog-to-digital converter being connected to an input to said memory means; an output from said memory means being connected to said input/output port.

* * * * *